R. M. JONES.
BATTERY CELL COVER.
APPLICATION FILED DEC. 12, 1919.

1,372,435.

Patented Mar. 22, 1921.

Inventor.
Reginald M. Jones.
by H. J. S. Dennison,
Atty.

UNITED STATES PATENT OFFICE.

REGINALD MELVILLE JONES, OF TORONTO, ONTARIO, CANADA.

BATTERY-CELL COVER.

1,372,435.  Specification of Letters Patent.  Patented Mar. 22, 1921.

Application filed December 12, 1919. Serial No. 344,272.

*To all whom it may concern:*

Be it known that I, REGINALD MELVILLE JONES, a subject of the King of Great Britain, and resident of the city of Toronto, county of York, Province of Ontario, in the Dominion of Canada, have invented certain new and useful Improvements in Battery-Cell Covers, described in the following specification and illustrated in the accompanying drawings, that form part of the same.

The principal objects of this invention are, to overcome the present existing difficulties of accessibility to the electrodes of a storage battery, thereby obviating considerable expense and loss of time in effecting repairs.

A further object is to enable the withdrawal of the opposing electrodes of a cell without interference with the sealing of the cover to the posts or terminals.

The principal feature of the invention consists in the novel construction of the cover, whereby said cover is divided into a plurality of separable sections adapted to be sealed together within the cell and to effectively inclose the electrolyte.

In the drawings, Figure 1 is a vertical longitudinal sectional view through my improved form of cover.

Figure 1:
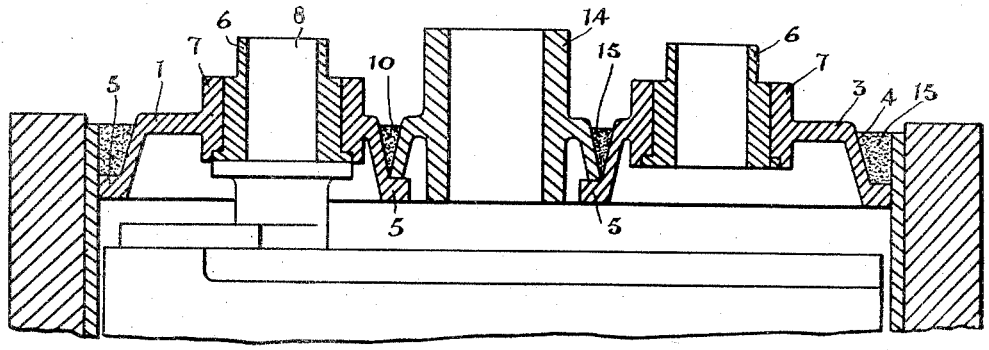
Figure 2:
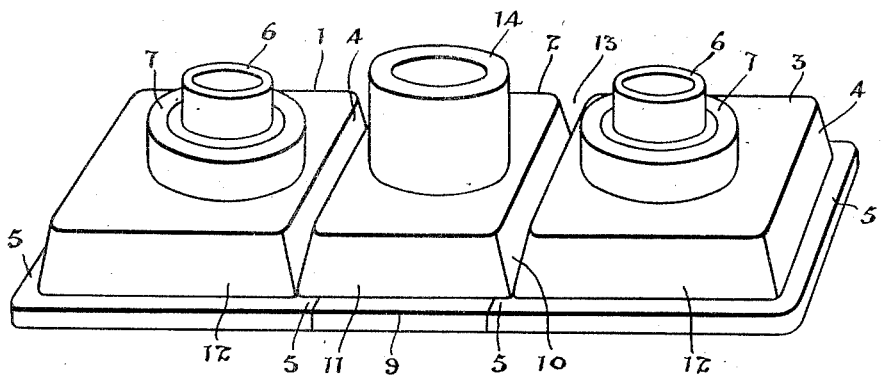
Fig. 2 is a perspective view of the cover removed from the cell.
Figure 3:
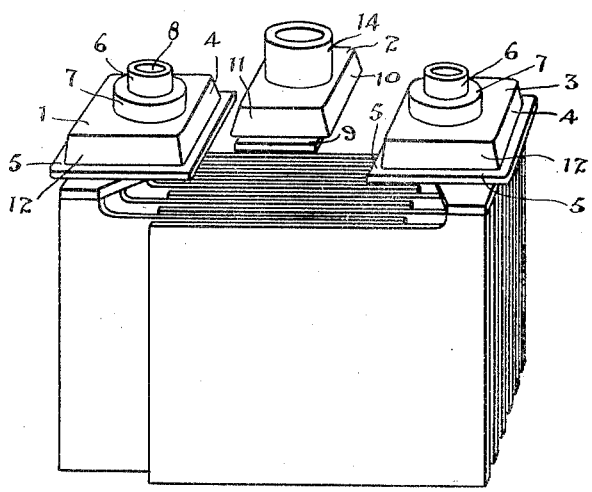
Fig. 3 is a perspective view of a pair of electrodes showing the manner of separating the cover.

Many difficulties are encountered in the handling of storage cells through the necessity for sealing in the electrolyte to prevent seepage or creeping of the same and this is most successfully accomplished by fusing the electrode terminals to metal sleeves cast into the covers. Hitherto this has resulted in a condition that renders it very difficult to remove the covers or separate the electrodes the one from the other as the negative and positive electrodes are physically connected by means of the cover member. This necessitates the disconnection of at least one electrode from the cover and to accomplish this result is extremely difficult owing to many peculiar conditions well known to those conversant with the use of batteries.

It is the aim of this invention to allow of access to the interior of the battery without disturbing the electrodes or when it is desired to disturb the electrodes they may be separated the one from the other in the simplest possible manner.

In order to accomplish this result I form the battery cover of a plurality of sections preferably dividing it into three members, 1, 2 and 3. The members 1 and 3 are of a cap-like formation having the beveled side walls 4 and laterally extending flanges 5 extending completely therearound.

In the tops of the members 1 and 3 are secured the metal sleeves 6 which are suitably embedded in the bosses 7. These sleeves are adapted to receive the terminal posts 8 of the battery electrodes.

The space between the end caps 1 and 3 is closed by the cap member 2 which has the flanged portions 9 fitting snugly between the flanges 5 of the members 1 and 3 and the beveled side walls 10 overlap and rest upon the inward flanges 5 of the caps 1 and 3. The flange 9 forms a continuation of the side flanges of the members 1 and 3 and the beveled end walls 11 of the central member aline with the beveled walls 12 of the members 1 and 3.

The outer faces of the walls 10 are beveled in the opposite direction to the adjacent walls of the caps 1 and 3 to form the V-shaped channels 13. This central cap is provided with a boss 14 which forms a gas vent and provides the opening, giving access to the cell for the replenishing of the electrolyte.

The cap segments are sealed by the usual fusible composition 15 which is flowed around all the joints and into the spaces between the side walls of the cell and the walls 4 and 12 and said composition also filling the spaces 13. When thus sealed the cover is as a unit.

When it is desired to obtain access to the cell the sealing cement is removed from the recess 13 and from the ends of the cap 2 when it may be withdrawn giving access to the interior of the cell. When it is desired to remove the electrodes the sealing cement is removed from around the cover segments 1 and 3 permitting the two electrodes to be drawn out together. The electrodes can then be separated the one from the other without in any manner interfering with the seal between the electrode terminals and the cover segments.

The cap is herein shown and described as formed in three pieces but it must be understood that either of the end caps may be made sufficiently long to incorporate the gas vent and a single transverse joint may be utilized though the three piece construction is the most desirable.

What I claim as my invention is:—

1. In a battery cell cover, the combination with a rectangular cell and a pair of electrodes having their terminals arranged at opposite ends of the cell, of a cover formed in sections separated transversely, one being connected to each of said terminals, said sections being sealed completely on all sides.

2. A battery cell cover formed of a plurality of rectangular sections having beveled sides and laterally projecting flanges below the beveled sides, abutting and closing the cell, and a sealing material filling the spaces around the beveled sides of said sections.

3. A battery cell cover, comprising a pair of rectangular end sections having laterally extending flanges, an intermediate section engaging the flanges of the end sections and fitting therebetween, and a sealing material placed between and around said sections.

4. A battery cell cover, comprising, a pair of rectangular end members adapted to engage the electrode terminals, said members having lateral flanges extending from the bottom and beveled sides above said flanges, a central section having its end walls overlapping the inward flanges of the end sections and formed with side flanges abutting the flanges of the end members to complete the side edges of the cover, said central section having its walls adjacent to the end sections spaced from the adjacent walls, and a sealing material arranged in the spaces between said sections and around the end members.

REGINALD MELVILLE JONES.